(12) United States Patent
Salva et al.

(10) Patent No.: US 8,572,500 B2
(45) Date of Patent: Oct. 29, 2013

(54) APPLICATION SCREEN DESIGN ALLOWING INTERACTION

(75) Inventors: Ryan J. Salva, Seattle, WA (US); Erik A. Saltwell, Seattle, WA (US); Heather T. Brown, Redmond, WA (US); Georgios Kounenis, Bellevue, WA (US); Matthew Hall, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/229,520

(22) Filed: Sep. 9, 2011

(65) Prior Publication Data

US 2013/0067360 A1    Mar. 14, 2013

(51) Int. Cl.
*G06F 3/048* (2013.01)

(52) U.S. Cl.
USPC .......................................... 715/763; 715/762

(58) Field of Classification Search
USPC ................................................ 715/762–763
See application file for complete search history.

(56) References Cited

U.S. PATENT DOCUMENTS

| | | |
|---|---|---|
| 7,143,347 B2 | 11/2006 | Su |
| 2006/0212790 A1* | 9/2006 | Perantatos et al. .......... 715/501.1 |
| 2006/0224697 A1* | 10/2006 | Norris ............................ 709/218 |
| 2009/0024939 A1* | 1/2009 | Cudich et al. .................. 715/762 |
| 2010/0088618 A1* | 4/2010 | Mayer-Ullmann ............ 715/763 |
| 2010/0188335 A1 | 7/2010 | Priddle et al. |
| 2011/0015917 A1 | 1/2011 | Wang et al. |
| 2011/0157609 A1* | 6/2011 | Brady et al. .................... 358/1.6 |
| 2012/0278691 A1* | 11/2012 | Heiney et al. .................. 715/202 |
| 2012/0290955 A1* | 11/2012 | Quine ............................ 715/763 |

OTHER PUBLICATIONS

HTML DOM—Events, Jun. 27, 2011 (Retrieved Date), (2 pages).
Adobe Dreamweaver, Jun. 27, 2006 (Retrieved Date), (4 pages).
IE Inspector, Jun. 27, 2006 (Retrieved Date), (1 page).
Assigning Event Handlers in the DOM, Jun. 27, 2006 (Retrieved Date), (2 pages).

* cited by examiner

*Primary Examiner* — Tuyetlien Tran
*Assistant Examiner* — Patrick Ramsey
(74) *Attorney, Agent, or Firm* — Workman Nydegger

(57) ABSTRACT

A screen design user interface that may operate in an interactive mode and a design mode. The user interface includes a screen presentation portion for presenting an application screen under design, and a mode control for selecting between the interactive mode and the design mode. When the user interface is in interactive mode, the user interface actually allows interaction with one or more application element of a screen displayed in the screen presentation portion such that interaction with the corresponding application element causes execution of a corresponding function and thus a corresponding change in state of the screen. When the user interface is in design mode, the user interface supports design of the application screen by recognizing design gestures, but disables the application elements.

18 Claims, 5 Drawing Sheets

APPLICATION SCREEN DESIGN ALLOWING INTERACTION

BACKGROUND

A web page that is downloaded to a client browser includes markup language, potentially some multi-media files, and potentially some script code. The markup language is most commonly HyperText Markup Language (HTML) and is interpretable by the browser to define the layout of the web page, along with some or potentially all of the content. The multimedia files may include video or images rendered automatically within the layout of the web page, or that may be rendered in response to execution of one or more controls. The script code allows the page to have more dynamic functionality and may be executed automatically and/or in response to a user interacting with controls on the page. Javascript is an example of a script coding language.

In order to apply a proper style to a page, the page designer has several options. First, the designer could edit the markup language itself, either directly or through a design tool. However, a more convenient solution, and a solution that allows styling that cannot be done by directly editing the markup, is to use style sheets. An example of a prolific style sheet language is Cascading Style Sheets or CSS. The designer may use an authoring tool to author and style a web page.

In modern web pages that are styled with style sheets, many page states can only be achieved by running the script code. Traditionally, designers who want to style these alternate states might make "best guess" edits in an authoring tool, then open a browser and interact with the running page, and then to see the result of those changes. Alternatively, the designer might manually recreate the alternate state in HTML markup. In the former case, the designer could not see the immediate results of their edits and so they would not receive immediate feedback for each design decision. In the latter case, the manually fashioned document state would require an inordinate amount of work, and even so often would not match the exact markup generated by executing the script code, resulting in erroneous, inefficient, or ineffective styling.

BRIEF SUMMARY

At least one embodiment described herein relates to a screen design user interface that may operate in an interactive mode and a design mode. The user interface includes a screen presentation portion for presenting an application screen under design, and a mode control for selecting between the interactive mode and a design mode. When the user interface is in interactive mode, the user interface actually allows interaction with one or more application elements of an application screen displayed in the screen presentation portion such that interaction with the corresponding application element causes a corresponding change in state of the application screen. For instance, the underlying function corresponding to the application element that is interacted with may be executed. When the user interface is in design mode, the user interface supports design of the application screen, but disables the application elements such that the interaction with the corresponding application element does not cause the corresponding change in state of the application screen. For instance, the underlying function corresponding to the application element that is interacted with may be disabled.

This allows the user to design and style the application screen after it has been interacted with. Thus, the user may interact with the application element of the application screen to thereby change the state of the application screen from one state to the next. Furthermore, each time the user is in design mode, the user may view and edit the appearance of the application screen. Thus, when styling an application screen, the user need not speculate about how the application screen would appear once interacted with, and design based on that speculation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a screen design user interface is described that may operate in an interactive mode and a design mode. The user interface includes a screen presentation portion for presenting an application screen under design, and a mode control for selecting between the interactive mode and a design mode. When the user interface is in interactive mode, the user interface actually allows interaction with one or more application elements of an application screen displayed in the screen presentation portion such that interaction with the corresponding application element causes a corresponding change in state of the application screen. For instance, the underlying function corresponding to the selected application element may be executed. When the user interface is in design mode, the user interface supports design of the application screen, but disables the application elements such that the interaction with the corresponding application element does not cause the corresponding change in state of the application screen. For instance, the underlying function corresponding to the selected application element is disabled. First, some introductory discussion regarding computing systems will be described with respect to FIG. 1. Then, the embodiments of the user interface and its operation will be described with respect to FIGS. 2 through 6.

Figure 1:
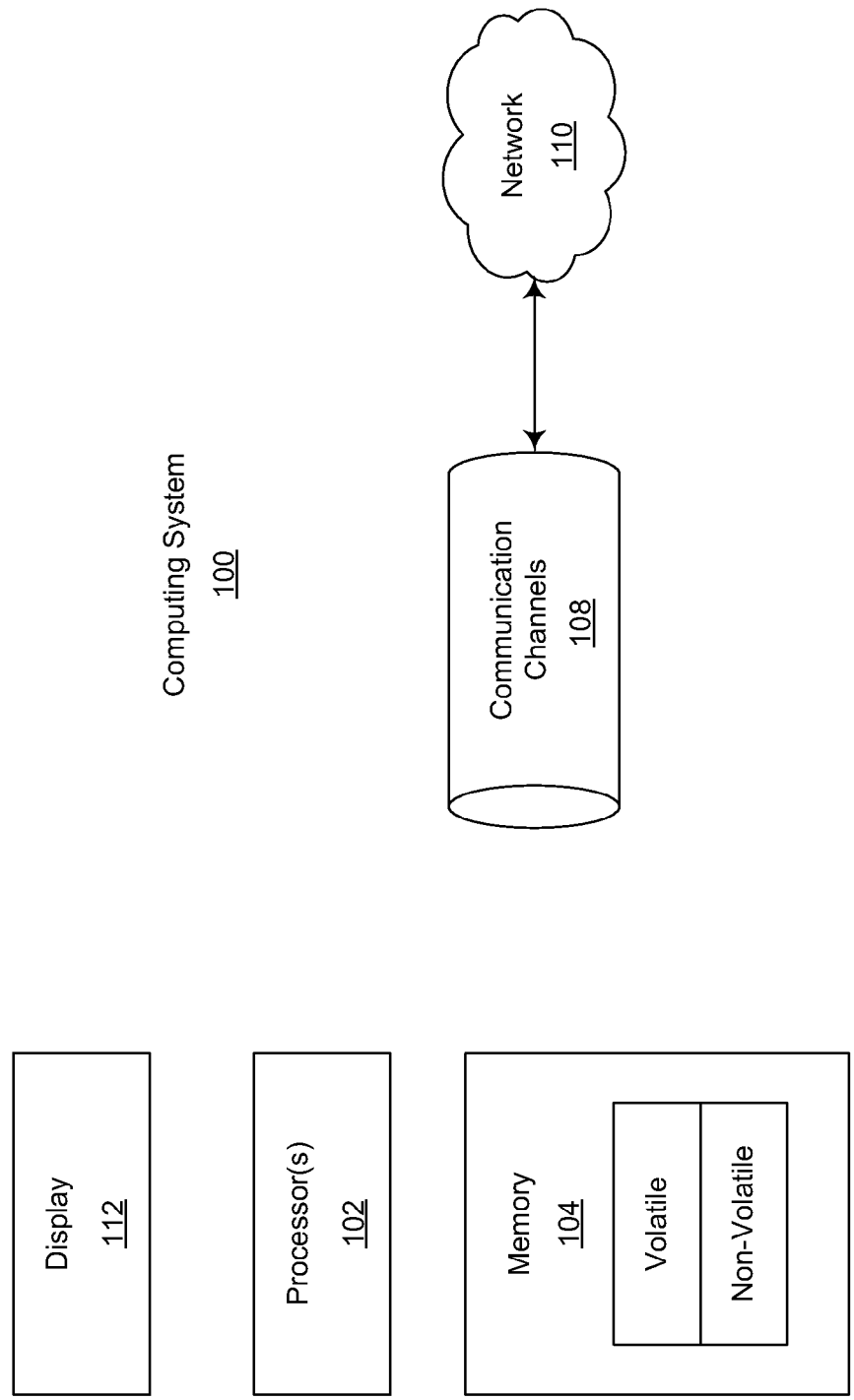
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 that may display one or more user interfaces that a user of the computing system may interface with.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. In this description and in the claims, a "computer program product" includes one or more computer storage media having computer-executable instructions thereon that, when executed by the one or more processors of the computing system, perform the function of the computer program product.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
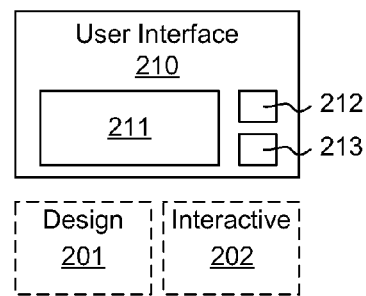
FIG. 2 abstractly illustrates an environment that may have a design mode and an interactive mode.

FIG. 2 abstractly illustrates an environment 200 in which the principles described herein may be employed. The environment 200 includes a user interface 210. The user interface 210 may be, for example, presented on a display 112 of the computing system 100 of FIG. 1. The user interface 210 may be, for example, part of an authoring tool that a designer may interface with in order to author and style an application screen. Accordingly, the user interface 210 includes a design mode 201. A computer program that has a user interface (hereinafter called a "user interface program") may often present one or more or potentially many applications screens to a user. The application screen may be any screen presented by an application. However, examples include web pages, or desktop application screens. In some cases, such screens may be rendered by interpreting markup language associated with the application screen. For instance, for web pages, the markup language may be interpreted by a browser.

However, unlike conventional authoring tools, the user interface 210 also has an interactive mode 202. The design mode 201 and interactive mode 202 are abstractly represented in FIG. 2, and represent general modes of operation of the user interface 210. Each individual application screen may have a number of different states. State transitions may be caused by a user interacting with the application screen while the user interface is in interactive mode 202, but may also be caused by other events that are not based on user interaction. The interactive mode 202 allows the user to interact with the application elements of an applications screen to thereby cause a state transition of the application screen. An "application element" is herein defined as a set of computer instructions that, when executed, directly or indirectly cause a change in state in the application screen. For instance, the user interaction may be a keyboard input, touch event, mouse event, or the like, and may involve an input gesture. In some cases, the application element may have a corresponding visualization in the displayed application screen, in which case the user might interact with the application element by interacting with its corresponding visualization. The user interaction may directly cause the state transition action to occur, or may cause some other application module or the execution environment of the application to cause the state transition action to occur. Examples of such state transition actions may include making requests to other application modules or to the execution environment, making some visual change to the current application screen, causing navigation to another application screen, changing some data on the computer memory (volatile or not), making some requests to other computer systems, and so forth.

The user interface 210 includes a screen presentation portion 211 for presenting an application screen under design (i.e., that is being authored and potentially also styled). Depending on whether the user interface 210 is in design mode 201 or interactive mode 202, the ability to interact with the application screen rendered in the screen presentation portion 211 may differ.

In design mode 201, the design may apply styles to the rendered application screen, but the designer does not actually interact with the application screen as if the corresponding user interface program were actually executing. Instead, user input events (window, mouse, and keyboard events, and so forth) are interpreted as design gestures.

In interactive mode 202, designers can interact with the application screen in the screen presentation portion 211 as if the corresponding user interface program were running in the target environment. Rather than interpret window, mouse, keyboard or other user input events as design gestures, interactive mode 202 permits these events to behave as they would in the target environment—triggering event handlers and/or other executable code.

For instance, suppose the application being designed was a movie application, and the application screen had an application element that allowed the user to enter a zip code, and a movie title. Upon activation of this application element in interactive mode, the executable code may actually retrieve movie information from a remote source and display a window with a list of theaters and showing times for theaters that are close by. This change in screen state is thus actually caused by the retrieval of information from a remote source, which retrieval is initiated by the user interacting with the application element. If the same application were in design mode, then such retrieval of information would not occur. Instead, the designer may just style a visualization of the application element, or otherwise construct a visualization of the application element.

Designers can thus build their application screen's base state in design mode 201, turn on interactive mode 202, interact with the application screen to thereby trigger a state transition (e.g., event handlers) in the application screen to an alternate state, switch to design mode 201, then style the alternate state. This may be repeatedly performed to create alternative states of the application screen.

The user interface 210 includes a mode control 212 for selecting between the design mode 201 and the interactive mode 202. The mode control 212 may be used to repeatedly switch between such modes 201 and 202. Optionally, the user interface may also include a navigation control 213 which may be used to navigate the application screen to a prior state (e.g., either its original state, or a prior intermediate state) of the application screen.

Figure 3:
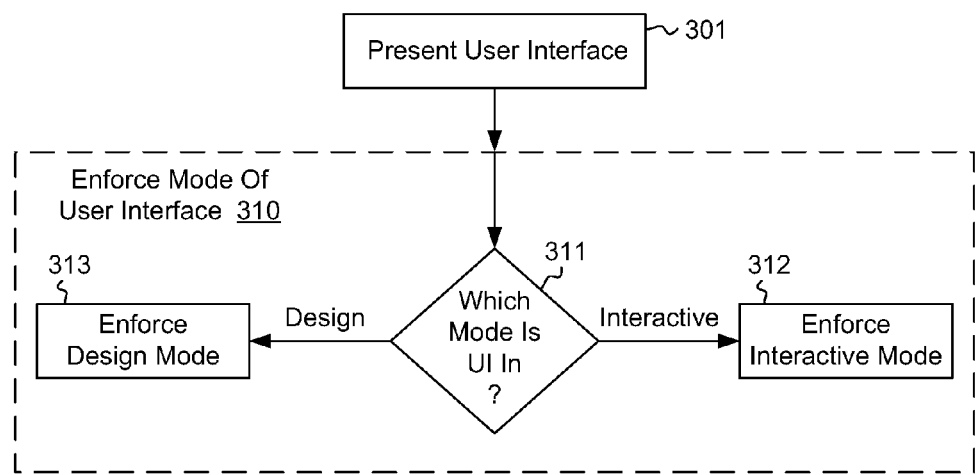
FIG. 3 illustrates a flowchart of a method for facilitating authoring of an application screen by enforcing whichever mode the user interface is in, whether it be design mode or interactive mode.

FIG. 3 illustrates a flowchart of a method 300 for facilitating authoring of an application screen. The method 300 may be performed in the environment 200 of FIG. 2, and thus will be described with frequent reference to the environment 200 of FIG. 2. The method 300 may be performed by a computing system in response to executing computer-executable instructions embodied on computer storage media. For instance, the method 300 may be performed by an authoring tool.

A user interface is presented that may operate in an interactive mode and a design mode (act 301). The user interface includes a screen presentation portion for presenting an application screen under design, and a mode control for selecting between the interactive mode and a design mode. For instance, in FIG. 2, the user interface 200 represents an example of such a user interface.

The authoring tool then enforces the selected mode (act 310). For instance, if the user interface is in interactive mode ("Interactive" in decision block 311), the authoring tool enforces interactive mode (act 312). In this case, the authoring tool allows interaction with one or more (or potentially all) application elements of the application screen. For instance, the user may interact with an application element visualization displayed in the screen presentation portion 211. This interaction causes execution of a corresponding application element, and thus causes a corresponding change in state of the application screen. Example interactions may include a mouse drag motion, a click action, a double click, a right click, a left click, a scroll, a text entry, or the like, or combinations thereof.

On the other hand, if the user interface is in design mode ("Design" in decision block 311), the authoring tool enforces design mode (act 313) by permitting design of the application screen, but disables the one or more application elements such that the interaction with corresponding application element or its visualization (if any) does not cause the execution of the application element, but is merely interpreted as a design gesture, at most. Thus, the interaction does not, by itself, cause a corresponding change in state of the application screen. As an example, the design mode may permit the designer to edit a style applied to the application screen, or edit a style applied to a visualization of an application element, or otherwise design or style the application screen.

In other words, upon receiving an indication that the user has interacted with an application element in the application screen; the user interface responds to the indication differently depending on whether the user interface is in interactive mode or in design mode. If in interactive mode, the indication causes execution of a corresponding application element to thus automatically change a state of the application screen. If in design mode, the user indication does not cause execution of the corresponding application element, but allows an appearance of the application screen to be edited by the designer.

Examples of state changes that may be enabled by entering interactive mode are limitless, and depend on the types of controls that are available in application screen, and the types of interaction the designer engages with in the context of that application screen. As examples only, perhaps in interactive mode, an additional visualization of an application element appears on the application screen (such as a pop up window, or a drop down menu), or perhaps the appearance of the visualization is changed (e.g., visualization is highlighted) upon interaction with the visualization.

Figure 4:
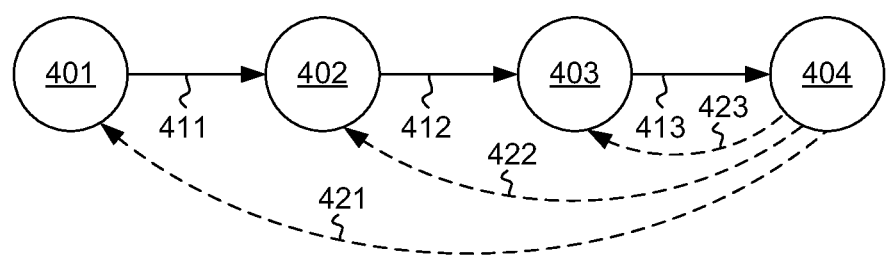
FIG. 4 illustrates a state transition sequence for an application screen in which each successive stage of design is separated by a corresponding interactive stage.

FIG. 4 abstractly illustrates a state transition sequence 400 for an application screen. In this case, the designer has designed an initial state 401 of the application screen in design mode. Then the designer interacts with the application screen in interactive mode and interact with the application screen to change the screen state (as represented by arrow 411) to a first intermediate state 402. Then the user may enter design mode and perform further design (authoring and/or styling) in the context of the first intermediate state 402. The user may then enter interactive mode and again interact with the application screen to change the screen state (as represented by arrow 412) to a second intermediate state 403. Then, the user may enter design mode and perform further design (authoring and/or styling) in the context of the second intermediate state 403. The user may then enter interactive mode and once again interact with the application screen to change the screen state (as represented by arrow 413) to a final state 404. Again, the user may enter design mode and perform further design (authoring and/or styling) in the context of the final state 404.

In the sequence of FIG. 4, the designer performed three stages of interaction resulting in four distinctive screen states. However, the designer could enter any number of interactive stages resulting in any number of distinctive successive screen states. This is because the designer may freely select the mode control to repeatedly change the user interface between the interactive mode and the design mode. In some embodiments, each of these successive screen states may be visualized on the user interface with smaller visualized representations (such as perhaps smaller thumbnail views of each screen state) along with perhaps having their order properly represented (such as having the thumbnail views presented from left to right, or top to bottom, in the order in which the corresponding screen states were generated). Furthermore, the computing system may keep track of not only the states themselves, but also the state transitions, such that a user may be presented with information representing the state changes that occurred when transitioning between successive screen states. Furthermore, the computing system may keep track of when the interaction was that caused the state transition to report the same to the user.

The user interface may also optionally have a navigation control (see navigation control 213 of FIG. 2) that, when activated, causes a state of the application screen to return to a prior state of the application screen. For instance, the navigation control 213 may be a reset control that resets the state of the application screen to its original state. Such a reset operation is represented in FIG. 4 using arrow 421 leading from the final screen state 404 to the original screen state 401. Alternatively or in addition, the navigation control 213 may be a rewind control that is capable of rewinding the screen state to a prior intermediate screen state. A first example of such a rewind operation is represented in FIG. 4 using arrow 422 leading from the final screen state 404 to the first intermediate screen state 402. A second example of such a rewind operation is represented in FIG. 4 using arrow 423 leading from the final screen state 404 to the second intermediate screen state 403.

Thus, the principles described herein may be used by a designer to design any application screen with any function, by allowing the designer to intermittently enter interactive mode to obtain alternative screen states that are different than the original screen state of the application screen. Thus, the user may design and style those alternative screen states directly. Although the principles described herein may apply to the design of literally any interactive application screen, a specific simple walkthrough example will be described with respect to FIGS. 5 and 6.

Figure 5:
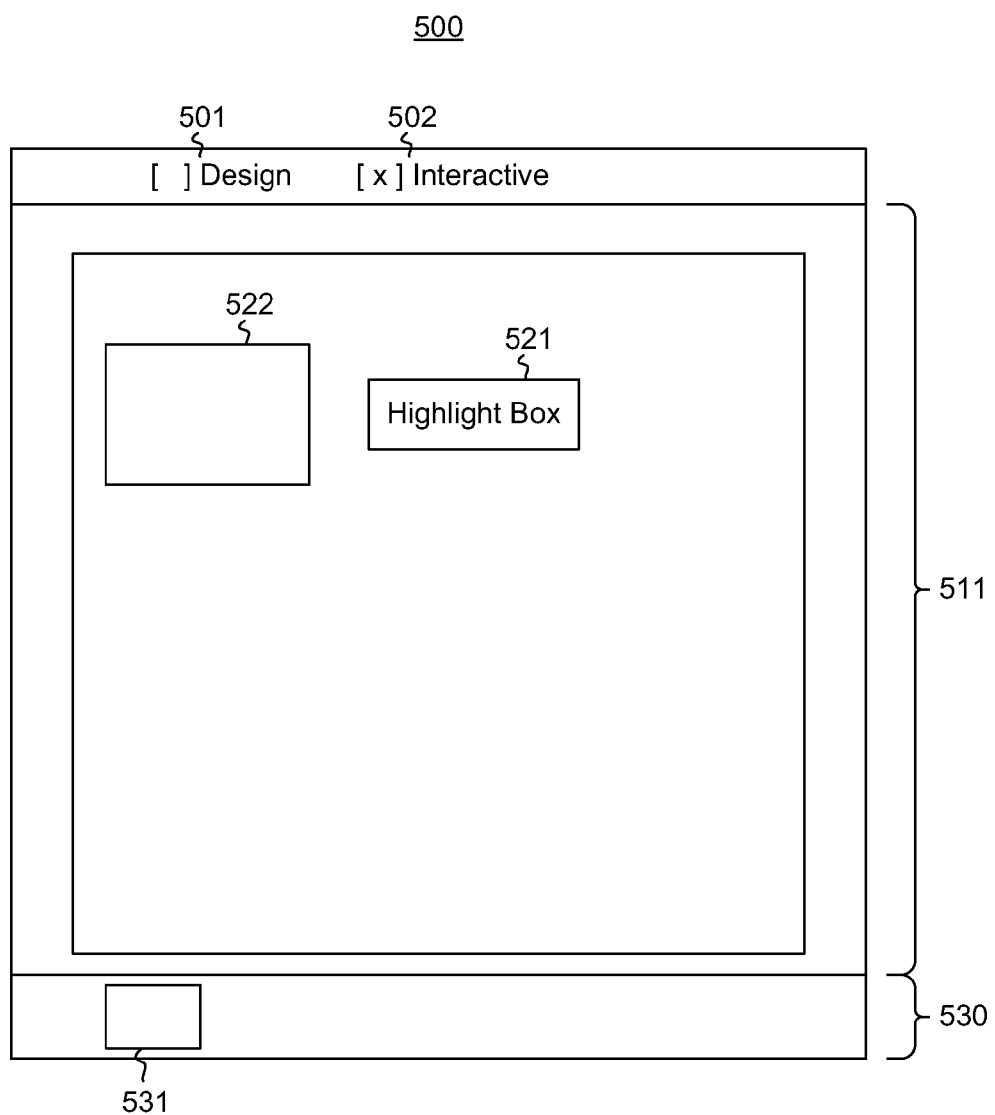
FIG. 5 illustrates an example user interface after completion of a design stage, and upon starting an interactive stage.

FIG. 5 illustrates a user interface 500 that represents a simple example of the user interface 210 of FIG. 2. The user interface 500 includes a design mode control 501 and an interactive mode control 502 that may be selected by the user to enter design mode and interactive mode, respectively. The user interface 500 also includes a screen presentation portion 511 that represents an example of the screen presentation portion 211 of FIG. 2. The screen presentation portion 511 is displaying an initial screen state in FIG. 5. For instance, the designer may have just opened the application screen, or may have just completed design of the initial screen state. In the initial screen state, the application screen has a selectable button 521 titled "Highlight Box". Previously, a developer has added scripting code (an example of an application element) to the application so that when the button 521 (an example of the visualization of the application element) is pushed, the element 522 on the left is given an additional classname of 'highlighted'. The user interface 500 also includes a history area 530 in which a screen state transition history may be displayed. Each state may be represented by a thumbnail view or other visualization of the screen state. In this case, only the initial state of the application screen has been entered, and thus the initial state visualization 531 is illustrated representing the initial screen state.

In this walkthrough, the designer continues by exiting design mode and entering interactive mode. Here, this is accomplished by selecting the "Interactive Mode" control 512. However, this is just an example. Alternatively, interactive mode might be entered by pushing a play button much like one would do when playing an audio or video. Now that the designer is in interactive mode, the screen presentation portion 511 acts like the running application, rather than a design surface. Window, mouse and keyboard events are processed as they would be in the target environment (e.g. a web browser).

In this interactive mode, suppose that the designer does indeed push the button 521. Because the user interface is in interactive mode, this causes execution of the corresponding script code that highlights the box, causing the element 522 to be highlighted. This designer may then exit interactive mode, enter design mode, and style the application screen. As an example, this may be accomplished by selecting the design mode control 501. The user interface may then appear as shown in FIG. 6.

Figure 6:
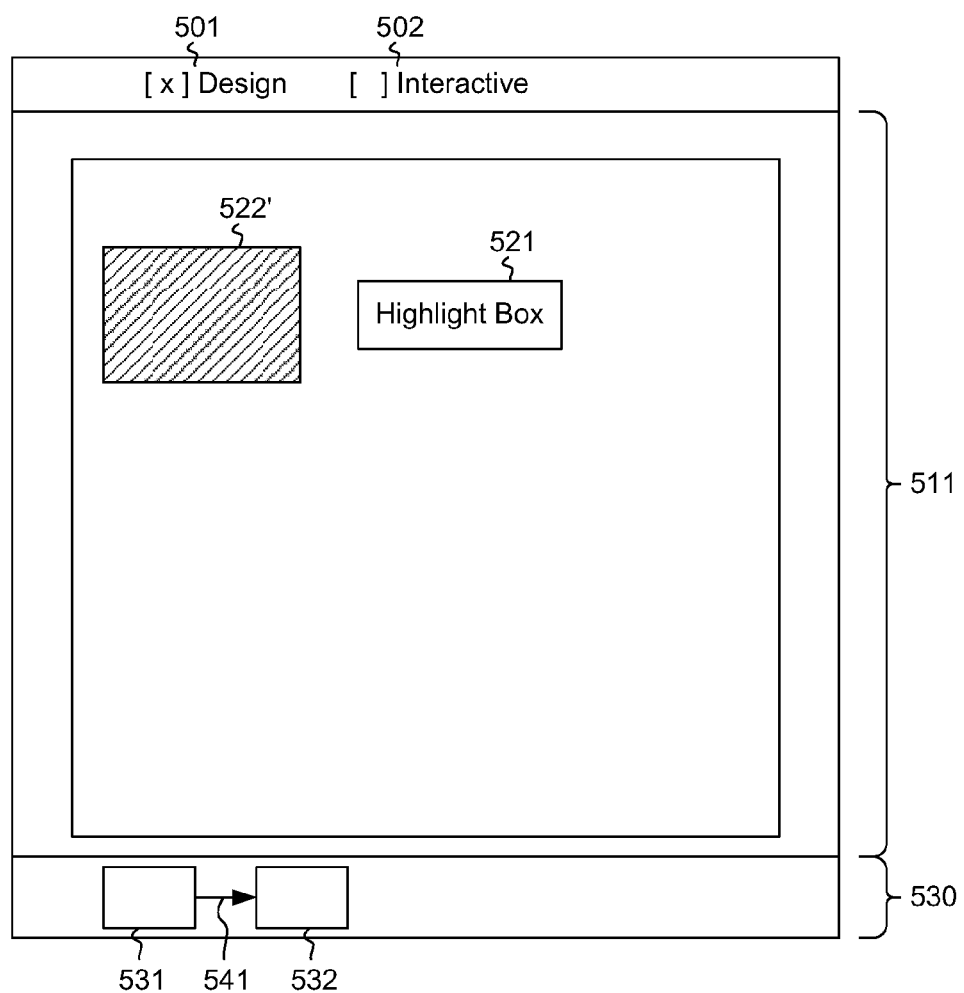
FIG. 6 illustrates the example user interface of FIG. 5 after completion of the interactive stage in which the button is pressed to highlight the text box.

FIG. 6 illustrates the user interface 600 that is similar to the user interface of FIG. 5, except that now the intermediate screen state is illustrated in the screen presentation portion 511. The user has entered design mode using design mode control 502. Here, in the intermediate state, the element 522' is highlighted (as represented by rightward-leaning hash lines). Suppose now that the element 522' was highlighted blue, but the designer instead wants it highlighted red. In design mode, the user may style the element 522' so that it is instead red. This design may be accomplished using design surface gestures.

The user interface 600 also shows some modification in the screen history portion 530. Specifically, now two visualizations, one for each of the screen states, are illustrated. Visualization 531 represents the initial screen state, and visualization 532 represents the subsequent screen state. The user can navigate between screen states may selecting the representative visualization. There may also be a visualization to represent the state transition. For instance, arrow 541 is an example of a visualization of the state transition between the initial screen state illustrated in the screen presentation portion 511 of FIG. 5, and the subsequent screen state illustrated in the screen presentation portion 511 of FIG. 6. By selecting the arrow 541, the user may be presented with specific information about the changes made as part of the corresponding state transition, and/or regarding the specific user interaction that initiated the state transition.

Although not illustrated in FIG. 5 or 6, parts of the user interface may be used in both design mode and interactive mode. For example, in addition to the screen presentation view, the authoring tool may have a style identification view of all the application elements that can be styled and some other styling view which can be used to style some elements in the view. Another example would be a diagnostic view which can show information about the current state of the application screen or the application elements in it.

Thus, the principles described herein allow an application screen designer to design and style not just the initial state of an application screen, but also alternate states of the application screen that are obtained by actually interacting with controls on the application screen, rather than trying to author such alternative states. This improves efficiency and accuracy in screen design, making it more likely the application screen will appear as intended when the user interface program executes in the target environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer storage media having thereon computer-executable instructions that are structured such that, when executed by one or more processors of a computing system, cause the computing system to perform a computer-implemented method for facilitating design of one or more screens of an application, where the method is comprised of the acts of:
    presenting a user interface which simultaneously displays in one screen the following:
        a screen presentation portion for presenting an application screen under design, the application screen including one or more application elements controlled by executable instructions that when executed, cause a change in the application screen's state;
        a history area for presenting various states of the application screen at different stages of design;
        a mode control for selecting between an interactive mode and a design mode for interacting with the presentation portion of the user interface; and
        a navigation control for selecting various states of the application screen;
    at the user interface,
        (i) when in the design mode, presenting in the presentation portion of the user interface the application screen but disabling any application elements of the application screen so the application screen does not change the state of the application screen, and providing at the presentation portion of the user interface the presented application screen that is thus limited to design changes of a stylistic nature; and
        (ii) when in the interactive mode presenting the application screen in the presentation portion of user interface the application screen as if the application screen is actively executing with any design change made during the design mode, and providing one or more application elements that effect a state transition for the application screen;
        (iii) storing the state transition for the application screen;
        (iv) displaying the application screen for the state transition in the history area of the user interface;
    repeating each of the acts (i)-(iv) one or more times; and
    presenting for selection at the user interface the stored states for the design of the application screen as displayed in the history area of the user interface.

2. The computer program product in accordance with claim 1, wherein the mode control can be used to repeatedly change the user interface between the interactive mode and the design mode.

3. The computer program product in accordance with claim 1, wherein the navigation control causes a state of the application screen to return to a prior state of the application screen.

4. The computer program product in accordance with claim 3, wherein the prior state of the application screen is an initial state of the application screen.

5. The computer program product in accordance with claim 3, wherein the prior state of the application screen is an intermediate state of the application screen that is between an initial state of the application screen and a current state of the application screen.

6. The computer program product in accordance with claim 1, wherein an application element causes a corresponding change in state of the application screen by executing code that is not part of a browser.

7. The computer program product in accordance with claim 1, wherein an application elements causes a corresponding change in state of the application screen by communicating with a remote computing system.

8. The computer program product in accordance with claim 1, wherein an application elements causes an additional application element to appear on the application screen.

9. The computer program product in accordance with claim 1, wherein the application screen is a web page.

10. The computer program product in accordance with claim 1, wherein the state transition of the application screen is caused by execution of a corresponding function in the executable instructions of the corresponding application element.

11. The computer program product in accordance with claim 1, wherein an application element has a visualization in the application screen.

12. The computer program product in accordance with claim 1, wherein the mode control can be used to repeatedly change the user interface between the interactive mode and the design mode such that there are a plurality of interaction stages, each connecting successive design stages of a plurality of design stages.

13. The computer program product in accordance with claim 12, wherein each of at least some of the plurality of design stages correspond to a distinctive state of the application screen.

14. The computer program product in accordance with claim 13, wherein the user interface includes a representation of at least some of the distinctive states of the application screen.

15. A computer-implemented method for facilitating design of one or more screens of an application, the method comprising acts of:
 presenting a user interface which simultaneously displays in one screen the following:
  a screen presentation portion for presenting an application screen under design, the application screen including one or more application elements controlled by executable instructions that when executed, cause a change in the application screen's state;
  a history area for presenting various states of the application screen at different stages of design;
  a mode control for selecting between an interactive mode and a design mode for interacting with the presentation portion of the user interface; and
  a navigation control for selecting various states of the application screen;
 at the user interface,
  (i) when in the design mode, presenting the application screen in the presentation portion of the user interface but disabling any application elements of the application screen so the user interaction with the application screen does not change the state of the application screen, and presented application screen is thus limited to design changes of a stylistic nature; and
  (ii) when in the interactive mode, presenting the application screen in the presentation portion of the user interface as if the application screen is actively executing with any design changes made during the design mode, and providing one or more application elements to effect a state transition for the application screen;
  (iii) storing the state transition for the application screen;
  (iv) displaying the application screen for the state transition in the history area of the user interface;
 repeating each of the acts (i)-(iv) one or more times;
 presenting for selection at the user interface the stored states for the design of the application screen as displayed in the history area of the user interface.

16. The method in accordance with claim 15, further comprising reversibly selecting whether the user interface operates in the interactive mode or the design mode.

17. The method in accordance with claim 16, wherein the mode control allows reversible selection of whether the user interface operates in the interactive mode or the design mode.

18. The method in accordance with claim 15, wherein the navigation control allows navigation of the application screen to any prior state.

\* \* \* \* \*